(12) United States Patent
Wang et al.

(10) Patent No.: US 8,031,400 B2
(45) Date of Patent: Oct. 4, 2011

(54) RETRACTABLE FRAME OF PROJECTION SCREEN

(75) Inventors: Shih-Jen Wang, Sanchong (TW); Hsien Lung Chen, Sanchong (TW); Li Chu Chen, Sanchong (TW)

(73) Assignee: Bright Supply Corp., Taipei County (TW)

( * ) Notice: Subject to any disclaimer, the term of this patent is extended or adjusted under 35 U.S.C. 154(b) by 748 days.

(21) Appl. No.: 12/149,762

(22) Filed: May 7, 2008

(65) Prior Publication Data

US 2009/0190212 A1    Jul. 30, 2009

(30) Foreign Application Priority Data

May 9, 2007    (TW) ............................. 96207444 U
Feb. 20, 2008  (TW) ............................. 97202977 U (51) Int. Cl.
*G03B 21/58* (2006.01)
(52) U.S. Cl. ..................................... 359/461
(58) Field of Classification Search .......... 359/450, 359/461; 160/31, 265
See application file for complete search history.

(56) References Cited

U.S. PATENT DOCUMENTS

| | | | | |
|---|---|---|---|---|
| 1,571,661 A * | 2/1926 | Descoteau | .......... | 160/373 |
| 3,144,899 A * | 8/1964 | La Mar et al. | .......... | 160/24 |
| 4,068,921 A * | 1/1978 | Okumura | .......... | 359/461 |
| 5,274,499 A * | 12/1993 | Shopp | .......... | 359/461 |
| 6,191,886 B1 * | 2/2001 | Sinkoff | .......... | 359/443 |
| 6,249,377 B1 * | 6/2001 | Takamoto et al. | .......... | 359/461 |
| 2005/0174638 A1 * | 8/2005 | Kotera | .......... | 359/461 |

FOREIGN PATENT DOCUMENTS

JP        2006251756 A  *  9/2006

* cited by examiner

*Primary Examiner* — Clayton E Laballe
*Assistant Examiner* — Leon W Rhodes, Jr.
(74) *Attorney, Agent, or Firm* — Guice Patents PLLC (57) ABSTRACT

The present invention relates to a retractable frame of projection screen comprises, a receiving case; a cylinder; a supporting arm; a main retractable arm; and an upper support; when folding, the upper support is downwardly pressed, then the cylinder retractable arm is forced to inwardly retract by the cylinder and the driven retractable arm is inwardly retracted toward the main retractable arm until the cylinder retractable arm is fully received in the cylinder and the driven retractable arm is fully received in the main retractable arm, so the projection screen, the upper support, the supporting arm, the connecting member and the main retractable arm are received in the accommodating space.

12 Claims, 6 Drawing Sheets

RETRACTABLE FRAME OF PROJECTION SCREEN

BACKGROUND OF THE INVENTION

1. Field of the Invention

The present invention relates to a retractable frame of projection screen, more particularly to a retractable frame of projection screen that is light in weight and small in volume and production cost thereof can be reduced.

2. Description of Related Art

Figure 1:
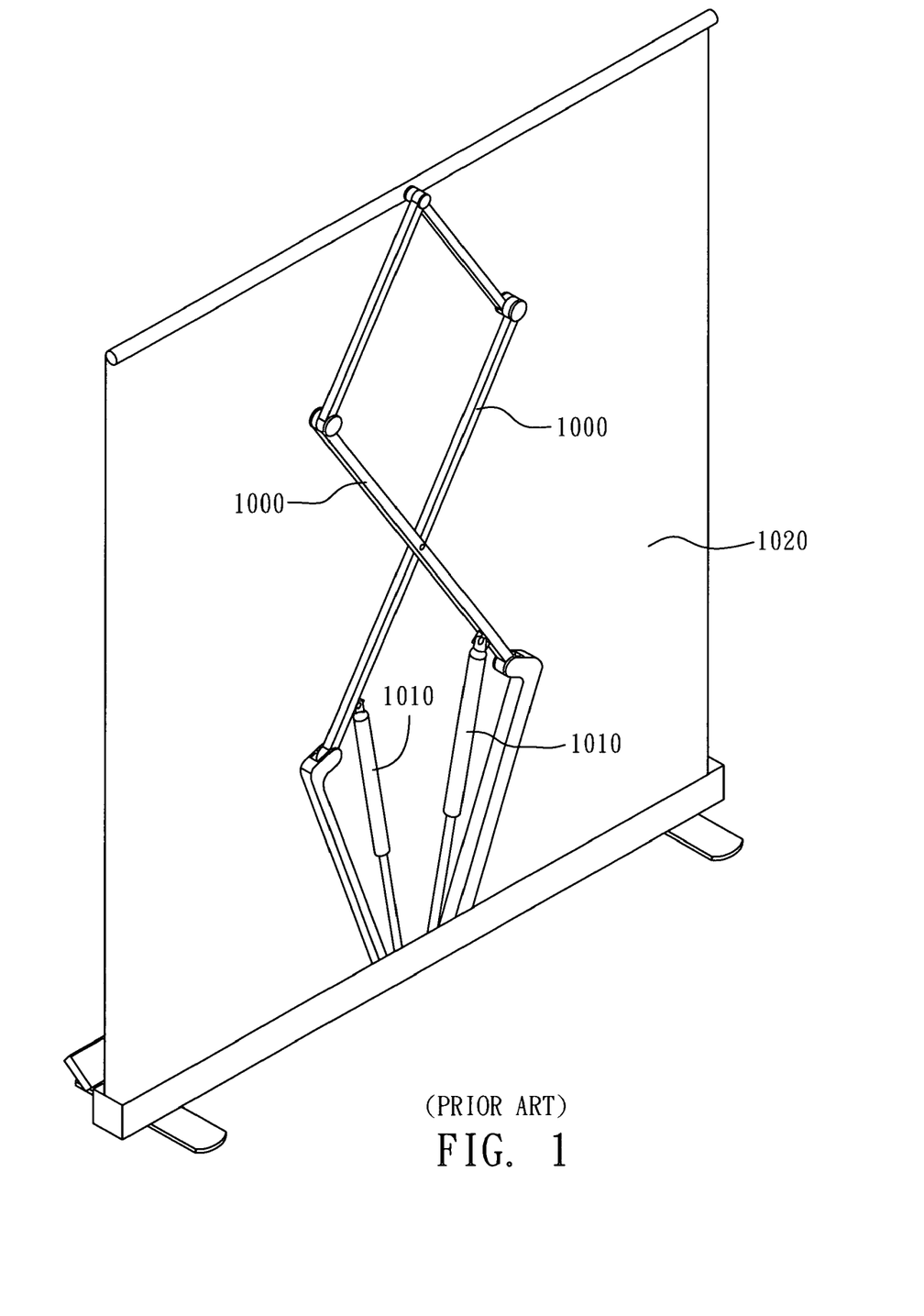
FIG. 1 is a schematic view of a conventional retractable frame of projection screen in an unfolding status.

Video/audio signals of a projector or an OLED TV are often projected to a large display panel or a large projection screen for obtaining a better viewing sensation. As shown in FIG. 1, which is a schematic view of a conventional retractable frame of projection screen in an unfolding status, a plurality of supporting arms 1000 that are intercrossed to each other are provided, and two of the supporting arms 1000 disposed at the bottom end are respectively provided with a retractable arm 1010, the two retractable arms 1010 are served to enhance the supporting strength of the projection screen 1020 and facilitate folding and unfolding the projection screen 1020.

The above mentioned retractable frame of projection screen needs quite a few of the supporting arms 1000 and the two retractable arms 1010 for enhancing the supporting strength of the projection screen 1020, but such retractable frame of projection screen is heavy in weight and large in volume and the production cost thereof is high. So a novel retractable frame of projection screen shall be invented.

SUMMARY OF THE INVENTION

One object of the present invention is to provide a retractable frame of projection screen that is small in volume and light in weight and the production cost thereof can be reduced.

For achieving the object mentioned above, the retractable frame of projection screen provided by the present invention comprising, a receiving case having an accommodating space; a cylinder having a cylinder retractable arm and the cylinder retractable arm being connected to the receiving case; a supporting arm, one end of the supporting arm being connected to the cylinder; a connecting member provided on the supporting arm; a main retractable arm having a main groove and a driven retractable arm, and the driven retractable arm having a retractable groove, wherein one end of the driven retractable arm is connected to the receiving case; an upper support for retaining the other end of the supporting arm and one end of the main retractable arm; and a screen axle provided on the upper support, a fixing axle being provided on the screen axle for folding a projection screen, wherein one end of the projection screen is connected to the upper support and the other end thereof is connected in the receiving case; when folding, the upper support is downwardly pressed, then the cylinder retractable arm is forced to inwardly retract by the cylinder and the driven retractable arm is inwardly retracted toward the main retractable arm until the cylinder retractable arm is fully received in the cylinder and the driven retractable arm is fully received in the main retractable arm, so the projection screen, the upper support, the supporting arm, the connecting member and the main retractable arm are received in the accommodating space.

For achieving the object mentioned above, the retractable frame of projection screen, comprising: a receiving case having an accommodating space; a bidirectional cylinder having a first cylinder retractable arm and a second cylinder retractable arm, wherein the first cylinder retractable arm is connected in one end of the receiving case; a supporting arm, one end thereof being connected to the second cylinder retractable arm of the bidirectional cylinder; a connecting member provided on the supporting arm; a main retractable arm having a main groove and a driven retractable arm, the driven retractable arm having a retractable groove, wherein one end of the driven retractable arm is connected to the receiving case; and an upper support for retaining the supporting arm and the other end of the main retractable arm; when folding, the upper support is downwardly pressed, when the first and the second cylinder retractable arms are inwardly retracted, the connecting member of the supporting arm is forced to downwardly slide alongside the main groove, so heights of the supporting arm and the main retractable arm are simultaneously lowered, and by connecting via the connecting member the heights of the supporting arm and the main retractable arm can be simultaneously lowered till fully folded, so a projection screen, the upper support, the bidirectional cylinder, the supporting arm, the connecting member and the main retractable arm are received in the accommodating space.

For achieving the object mentioned above, the retractable frame of projection screen, comprising: a receiving case having an accommodating space; a supporting arm, one end of the supporting arm being connected to one end of the receiving case, and a protruding tenon being provided on the supporting arm; a cylinder, one end of the cylinder being connected to the supporting arm, and the cylinder being provided with a cylinder retractable arm connected to one end of the receiving case; a driven supporting arm, one end of the driven supporting arm being connected to the other end of the receiving case, and a sliding groove being provided on the driven supporting arm for receiving the protruding tenon and allowing the protruding tenon sliding thereon; a main linkage arm, one end of the main linkage arm being connected to the other end of the supporting arm via a first pivot; a driven linkage arm, one end of the driven linkage arm being connected to the other end of the driven supporting arm via a second pivot; and an upper support for retaining the main linkage arm and the other end of the driven linkage arm; when folding, the upper support is downwardly pressed, when the cylinder retractable arm is retracted and the protruding tenon of the supporting arm is forced to downwardly slide alongside the sliding groove, so heights of the supporting arm and the driven supporting arm are simultaneously lowered, by connecting via the first pivot and the second pivot, heights of the main linkage arm and the driven linkage arm are also simultaneously lowered till fully folded, so a projection screen, the upper support, the cylinder, the supporting arm, the first pivot, the second pivot, the main linkage arm and the driven linkage arm are received in the accommodating space.

For achieving the object mentioned above, the retractable frame of projection screen, at least including: an upper support; a screen axle disposed on the upper support, a fixing axle being provided on the screen axle for folding a projection screen, wherein one end of the projection screen is connected to the upper support; a rolling device provided on the upper support or in a receiving case mentioned below for rolling the projection screen; and a receiving case, the receiving case has an accommodating space for retaining the other end of the projection screen.

DETAILED DESCRIPTION OF THE PREFERRED EMBODIMENT

Figure 2:
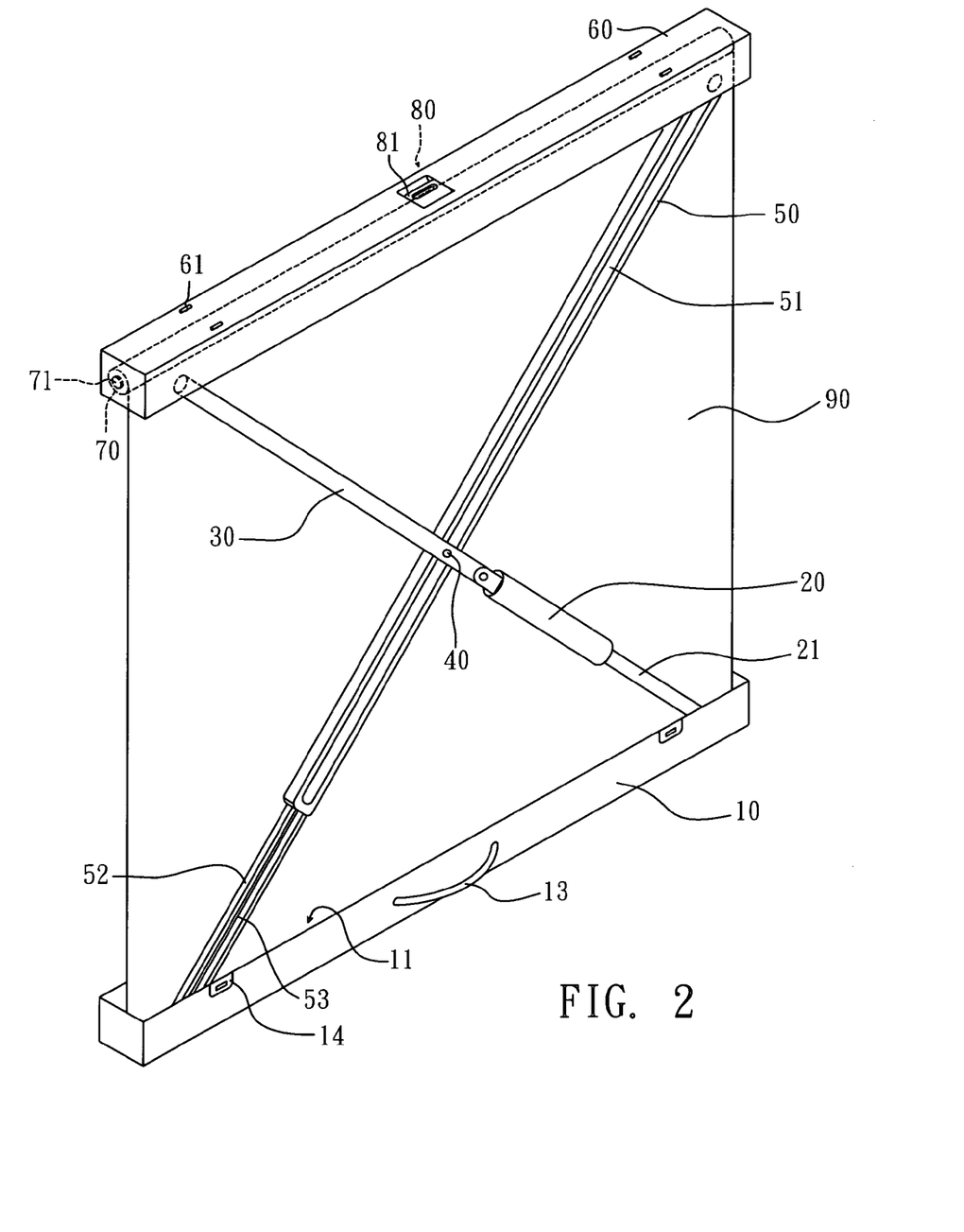
FIG. 2 is schematic 3D view of a retractable frame of projection screen of one preferred embodiment of the present invention in an unfolding status.
Figure 3:
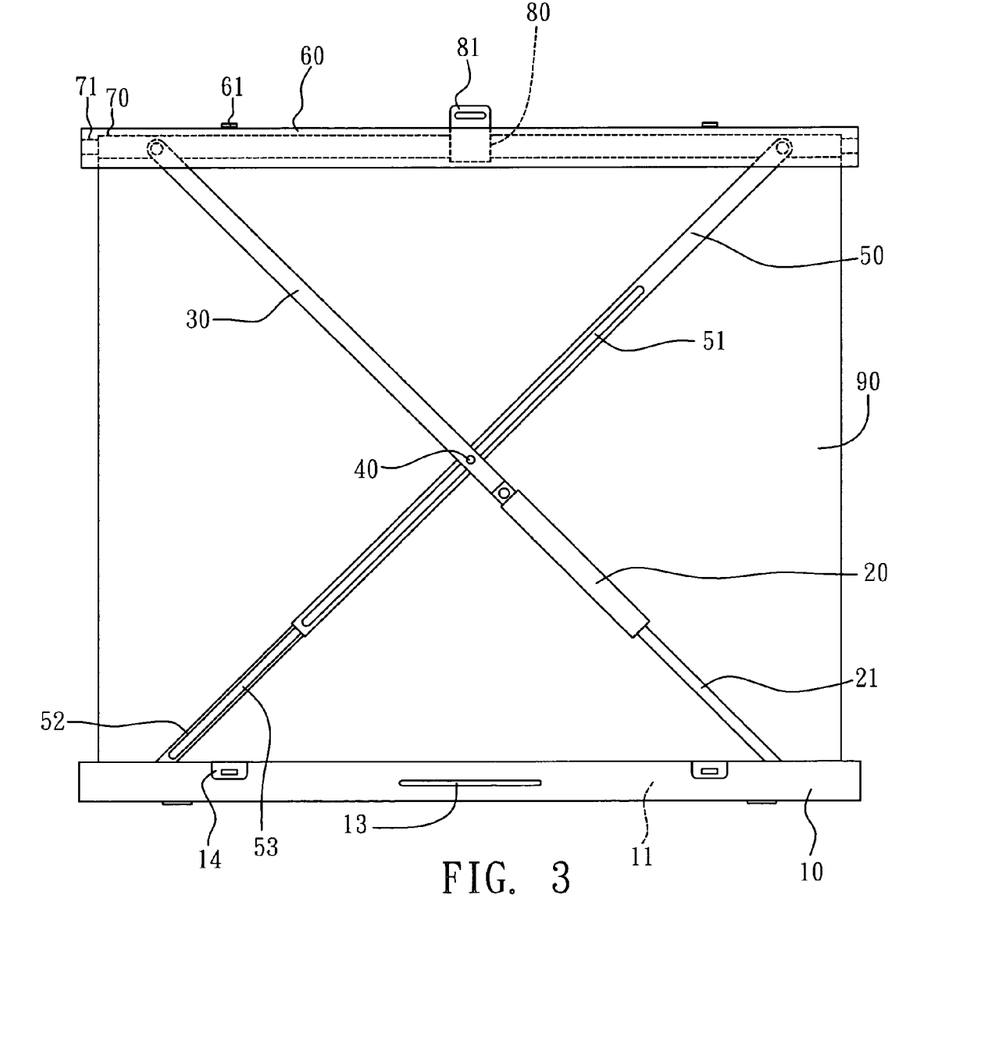
FIG. 3 is schematic plane view of the retractable frame of projection screen of one preferred embodiment of the present invention in an unfolding status.
Figure 4:
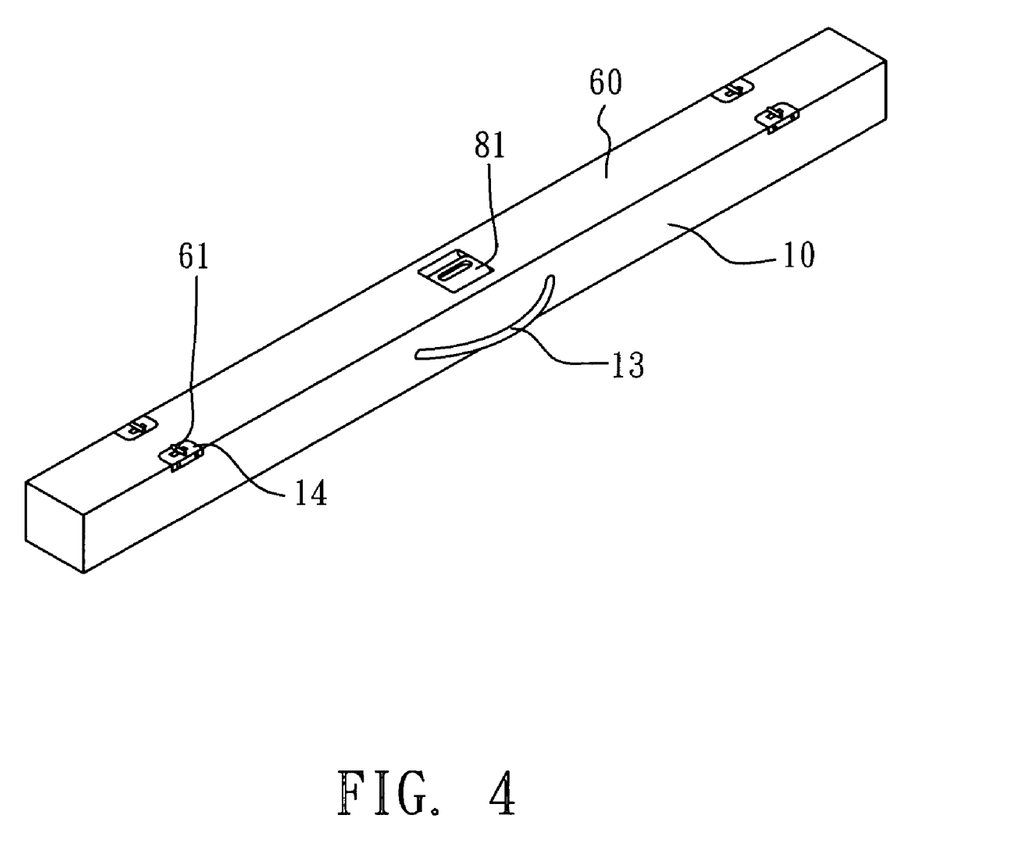
FIG. 4 is schematic view of the retractable frame of projection screen of one preferred embodiment of the present invention in a folding status.

Referring to FIG. 2 to FIG. 4, wherein FIG. 2 is schematic 3D view of a retractable frame of projection screen of one preferred embodiment of the present invention in an unfolding status; FIG. 3 is schematic plane view of the retractable frame of projection screen of one preferred embodiment of the present invention in an unfolding status; FIG. 4 is schematic view of the retractable frame of projection screen of one preferred embodiment of the present invention in a folding status.

As shown in figures, the retractable frame of projection screen provided by the present invention comprises: a receiving case 10; a cylinder 20; a supporting arm 30; a connecting member 40; a main retractable arm 50; an upper support 60; and a screen axle 70.

The receiving case 10 has an accommodating space 11 for receiving the cylinder 20, the supporting arm 30, the connecting member 40, the main retractable arm 50, the upper support 60 and the screen axle 70, the receiving case 10 is preferably made of metal materials.

The cylinder 20 has a cylinder retractable arm 21 connected to the receiving case 10, the cylinder retractable arm 21 is retractable within the cylinder 20. Wherein the working power of the cylinder retractable arm 21 is for example but not limited to be driven by an air force, oil force, electric force or a magnetic force and so on.

One end of the supporting arm 30 is directly connected to one end of the upper support 60, for example but not limited to, being directly screwed on the upper support 60, and the supporting arm 30 is preferably made of metal materials.

The connecting member 40 is provided on the supporting arm 30 for connecting the supporting arm 30 and the main retractable arm 50, the connecting member 40 can be, but not limited to, a pivot.

The main retractable arm 50 is provided with a main groove 51 and a driven retractable arm 52, and a retractable groove 53 is provided on the driven retractable arm 52, wherein the main groove 51 is served to let the connecting member 40 slide, and one end of the driven retractable arm 52 is connected to the other end of the receiving case 10, and the main retractable arm 50 is preferably made of metal materials.

The upper support 60 is served to retain the other end of the supporting arm 30 and one end of the main retractable arm 50, and the upper support 60 is preferably made of metal materials for allowing a projection screen 90 being hanged thereon, wherein the projection screen 90 can be, but not limited to, a textile screen, wherein one end of the projection screen 90 is connected to the upper support 60 and the other end thereof is connected to the receiving case 10.

The position where one end of the cylinder retractable arm 21 is connected to the receiving case 10 is substantially parallel to the position where one end of the main retractable arm 50 is connected to the upper support 60, and the position where the other end of the supporting arm 30 is connected to the upper support 60 is substantially parallel to the position where the other end of the retractable groove 53 is connected to the receiving case 10, so when the retractable frame of projection screen provided by the present invention is unfolded, the appearance thereof is substantially in an X shape.

The screen axle 70 is provided with a fixing axle 71 for folding the projection screen 90. The projection screen 90 can be rolled by the screen axle 70 with a mechanical means or an electromotive means.

The receiving case 10 further comprises a handle 13, wherein two ends of the handle 13 are respectively provided with a second buckling device 14 with respect to one of two first buckling devices 61 provided on the upper support 60 so each of the second buckling devices 14 can be buckled with the corresponding first buckling device 61 of the upper support 60.

The retractable frame of projection screen provided by the present invention further comprises a rolling device 80, the rolling device 80 can be disposed in the receiving case 10 or on the upper support 60 for rolling/unrolling the projection screen 90, and the rolling device 80 can be spring-biased by a spring member, a tubular motor or a synchronous motor; when the rolling device 80 is a tubular motor or a synchronous motor, the rolling device 80 can be controlled by a wired or wireless means, for example but not limited to, a radio frequency (RF) or an infrared (IR) control means or the combination thereof; when the rolling device 80 is spring-biased by a spring member and is disposed on the upper support 60, the rolling device 80 can be further provided with a manual braking device (not shown), a handle 81 is provided on the manual braking device; the screen axle 70 is on the same side as the rolling device 80, for example in the receiving case 10 or on the upper support 60.

As shown in FIG. 4, which is schematic view of a retractable frame of projection screen provided by the present invention in a folding status, when folding the retractable frame of projection screen provide by the present invention, the upper support 60 is downwardly pressed, then the cylinder retractable arm 21 is forced to inwardly retract by the cylinder 20 and the driven retractable arm 52 is inwardly retracted toward the main retractable arm 50 until the cylinder retractable arm 21 is fully received in the cylinder 20 and the driven retractable arm 52 is fully received in the main retractable arm 50, so the projection screen 90, the upper support 60, the supporting arm 30, the connecting member 40 and the main retractable arm 50 are received in the accommodating space 11.

When unfolding the retractable frame of projection screen provide by the present invention, the handle 81 is upwardly pulled so the rolling device 80 is released or activated, and the upper support 60 is upwardly pulled to a pre-set height then the handle 81 is released, the projection screen 90 and the screen axle 70 are both held by the rolling device 80 (having same function as a manual braking device), then with a supporting strength from the cylinder retractable arm 21 a positioning status is therefore obtained. With the above mentioned tubular motor and or the synchronous motor controlled by a wired or a wireless means for rolling or unrolling and with operations of the supporting arm 30, the connecting member 40, the main retractable arm 50, the screen axle 70, etc, the positioning operation or operation of rolling/unrolling can be operated with an electromotive means. So the retractable frame of projection screen provided by the present invention has advantages of reducing units used, small in volume, easy to operate, compared to a convention retractable frame of projection screen.

Figure 5:
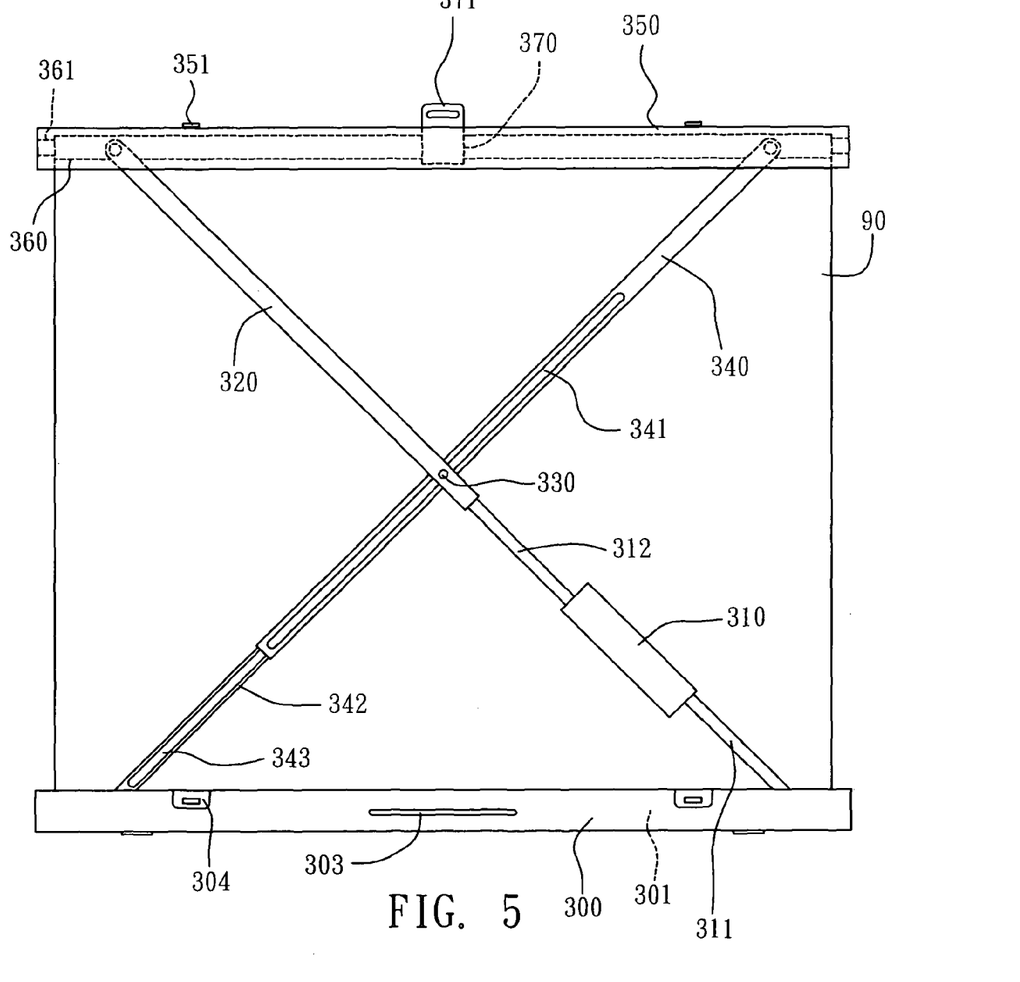
FIG. 5 is a schematic view of a retractable frame of projection screen of another preferred embodiment of the present invention in an unfolding status.

Referring to FIG. 5, which is a schematic view of a retractable frame of projection screen of another preferred embodiment of the present invention in an unfolding status, the retractable frame of projection screen provided by the present invention comprises: a receiving case 300; a bidirectional cylinder 310; a supporting arm 320; a connecting member 330; a main retractable arm 340; an upper support 350; and a screen axle 360.

The receiving case 300 has an accommodating space 301 for receiving the bidirectional cylinder 310, the supporting arm 320, the connecting member 330, the main retractable arm 340, the upper support 350 and the screen axle 360 when in a folding status, and the receiving case 300 is preferably made of metal materials.

The bidirectional cylinder 310 has a first cylinder retractable arm 311 and a second cylinder retractable arm 312, wherein the first retractable arm 311 is connected to one end of the receiving case 300, and materials of which the bidirectional cylinder 310 is made can be, but not limited to, metals. Wherein the working power of the first cylinder retractable arm 311 and second cylinder retractable arm 312 is for example but not limited to be driven by an air force, oil force, electric force or a magnetic force and so on, respectively.

One end of the supporting arm 320 is connected to one end of the second cylinder retractable arm 312, and materials of which the supporting arm 320 is made can be, but not limited to, metals.

The connecting member 330 is provided on the supporting arm 320, and the connecting member 330 can slide in a main groove 341 mentioned below. The supporting arm 320 and the main retractable arm 340 are connected by the connecting member 330 with a fashion of riveting, screwing or a protruding tenon.

The main retractable arm 340 has a main groove 341 and a driven retractable arm 342, and the driven retractable arm 342 has a retractable groove 343, wherein the main groove 341 is served to let the connecting member 330 slide and one end of the driven retractable arm 342 is connected to the other end of the receiving case 300, the main retractable arm 340 is preferably made of metal materials.

The upper support 350 is served to retain the other end of the main retractable arm 340 and one end of the supporting arm 320, and the upper support 350 is preferably made of metal materials for allowing a projection screen 90 being hanged thereon, wherein the other end of the projection screen 90 is connected to the receiving case 300, and the projection screen 90 can be, but not limited to, a textile screen.

The screen axle 360 has a fixing axle 361 for folding the projection screen 90. The projection screen 90 can be rolled by the screen axle 360 with a mechanical means or an electromotive means.

The receiving case 300 further comprises a handle 303, two ends of the handle 303 are respectively provided with a second buckling device 304 with respect to one of two first buckling devices 351 provided on the upper support 350 so each of the second buckling devices 304 can be buckled with the corresponding first buckling device 351 of the upper support 350.

The retractable frame of projection screen provided by the present invention further comprises a rolling device 370, the rolling device 370 can be disposed in the receiving case 300 or on the upper support 350 for rolling/unrolling the projection screen 90, and the rolling device 370 can be spring-biased by a spring member, a tubular motor or a synchronous motor; when the rolling device 370 is a tubular motor or a synchronous motor, the rolling device 80 can be controlled with a wired or a wireless means, for example but not limited to, a radio frequency (RF) or an infrared (IR) control means or the combination thereof; when the rolling device 370 is spring-biased by a spring member and is disposed on the upper support 350, the rolling device 370 can be further provided with a manual braking device (not shown), a handle 371 is provided on the manual braking device; the screen axle 360 is on the same side as the rolling device 370, for example in the receiving case 300 or on the upper support 350.

When folding, the upper support 350 is downwardly pressed, the first cylinder retractable arm 311 and the second cylinder retractable arm 312 are inwardly retracted and the connecting member 330 of the supporting arm 320 is forced to downwardly slide alongside the main groove 341, so heights of the supporting arm 320 and the main retractable arm 340 are simultaneously lowered, by connecting via the connecting member 330 the heights of the supporting arm 320 and the main retractable arm 340 are simultaneously lowered till fully folded, so the projection screen 90, the upper support 350, the bidirectional cylinder 310, the supporting arm 320, the connecting member 330 and the main retractable arm 340 are received in the accommodating space 301. With the above mentioned tubular motor and or the synchronous motor controlled by a wired or a wireless means for rolling or unrolling and with operations of the bidirectional cylinder 310, the supporting arm 320, the connecting member 330, the main retractable arm 340, the screen axle 360, etc, the positioning operation or operation of rolling/unrolling can be operated with an electromotive means.

Figure 6:
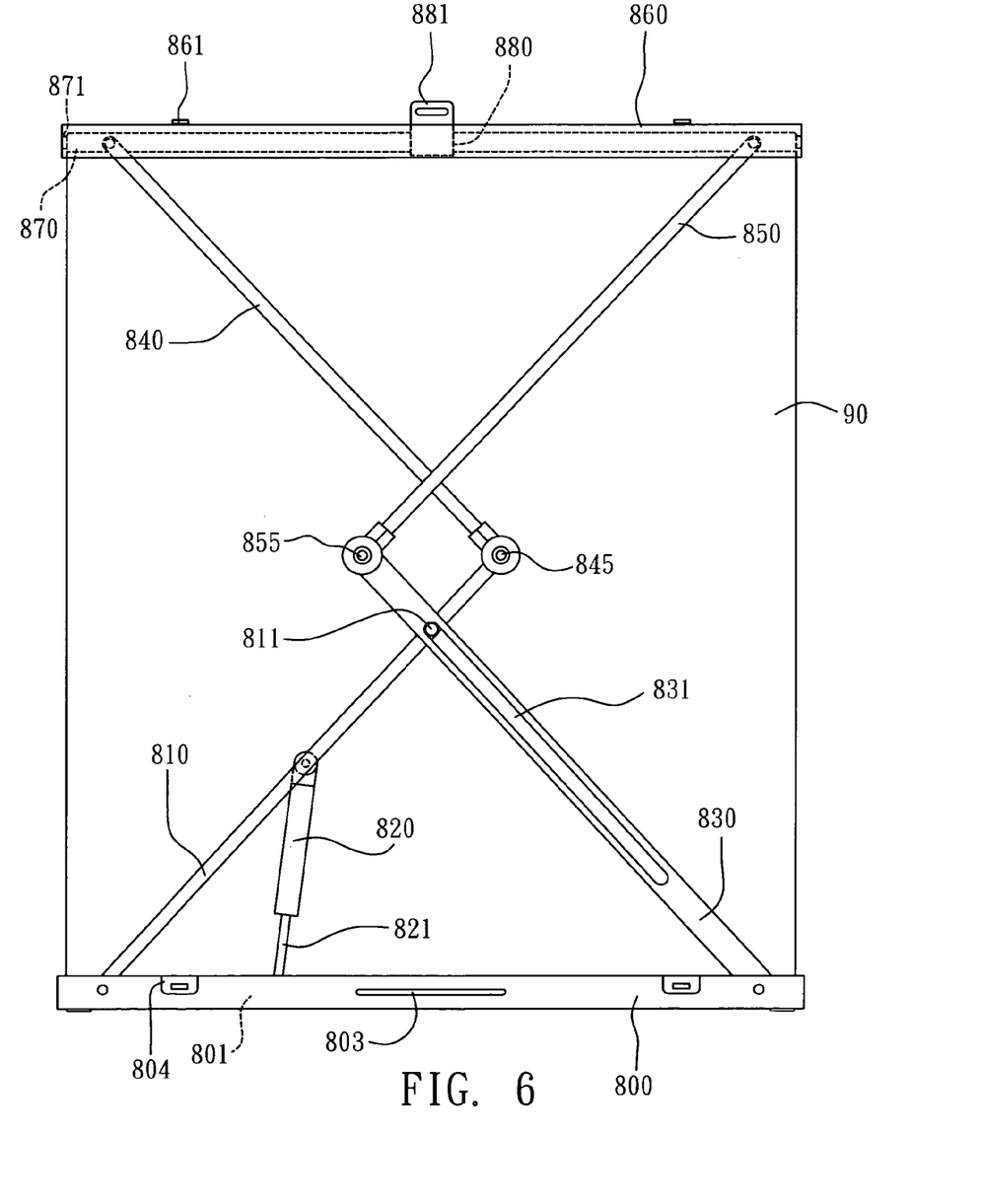
FIG. 6 is a schematic view of a retractable frame of projection screen of one another preferred embodiment of the present invention in an unfolding status.

Referring to FIG. 6, which is a schematic view of a retractable frame of projection screen of one another preferred embodiment of the present invention in an unfolding status, the retractable frame of projection screen provided by the present invention comprises: a receiving case 800; a supporting arm 810; a cylinder 820; a driven supporting arm 830; a main linkage arm 840; a driven linkage arm 850; an upper support 860; and a screen axle 870.

The receiving case 800 has an accommodating space 810 for receiving the upper support 860, the cylinder 820, the supporting arm 810, the main linkage arm 840 and the driven linkage arm 850, and the receiving case 800 is preferably made of metal materials.

One end of the supporting arm 810 is connected to one end of the receiving case 800, a protruding tenon 811 is provided on the supporting arm 810, and materials of which the supporting arm 810 is made can be, but not limited to, metals.

The cylinder 820 has a cylinder retractable arm 821, the cylinder retractable arm 821 is connected to one end of the receiving case 800, and materials of which the cylinder 820 is made can be, but not limited to, metals. The position where one end of the cylinder retractable arm 821 of the cylinder 820 is connected to the receiving case 800 is on the right hand side of the supporting arm 810. Wherein the working power of the cylinder retractable arm 821 is for example but not limited to be driven by an air force, oil force, electric force or a magnetic force and so on.

One end of the driven supporting arm 830 is connected to the other end of the receiving case 800 and a sliding groove 831 is provided on the driven supporting arm 830 for receiving the protruding tenon 811 and allowing the protruding tenon 811 slides thereon, and materials of which the driven supporting arm 830 is made can be, but not limited to, metals.

One end of the main linkage arm 840 can be connected to the other end of the supporting arm 810 via a first pivot 845, and materials of which the main linkage arm 840 is made can be, but not limited to, metals One end of the driven linkage arm 850 can be connected to the other end of the driven supporting arm 830 via a second pivot 855, and materials of which the driven linkage arm 850 is made can be, but not limited to, metals.

The upper support 860 is served to retain the main linkage arm 840 and the other end of the driven linkage arm 850, and the upper support 860 is preferably made of metal materials for allowing a projection screen 90 being hanged thereon, wherein the projection screen 90 can be, but not limited to, a textile screen, one end of the projection screen 90 is connected to the upper support 860 and the other end thereof is connected to the receiving case 800. The position where one end of the first cylinder retractable arm 821 of the cylinder 820 is connected to the receiving case 800 is on the right hand side of the supporting arm 810.

The screen axle 870 has a fixing axle 871 for folding the projection screen 90. The projection screen 90 can be rolled by the screen axle 870 with a mechanical means or an electromotive means.

The receiving case 800 further comprises a handle 803, two ends of the handle 803 are respectively provided with a second buckling device 804 with respect to one of two first buckling device 861 provided on the upper support 860 so each of the second buckling devices 804 can be buckled with the corresponding first buckling device 861 of the upper support 860.

The retractable frame of projection screen provided by the present invention further comprises a rolling device 880, the rolling device 880 can be disposed in the receiving case 800 or on the upper support 860 for rolling/unrolling the projection screen 90, and the rolling device 880 can be spring-biased by a spring member, a tubular motor or a synchronous motor; when the rolling device 880 is a tubular motor or a synchronous motor, the rolling device 880 can be controlled with a wired or a wireless means, for example but not limited to, a radio frequency (RF) or an infrared (IR) control means or the combination thereof; when the rolling device 880 is spring-biased by a spring member and is disposed on the upper support 860, the rolling device 880 can be further provided with a manual braking device (not shown), a handle 881 is provided on the manual braking device; the screen axle 870 is on the same side as the rolling device 880, for example in the receiving case 800 or on the upper support 860.

When the handle 881 is upwardly pulled, the rolling device 880 is released or activated, and the upper support 860 is upwardly pulled to a pre-set height then the handle 881 is released, the projection screen 90 and the screen axle 870 are both held by the rolling device 880 (having same function as a manual braking device), then with a supporting strength from the cylinder retractable arm 821 a positioning status is therefore obtained; when folding, the upper support 860 is downwardly pressed, the cylinder retractable arm 821 is retracted and the protruding tenon 811 of the supporting arm 810 is forced to downwardly slide alongside the sliding groove 831, so heights of the supporting arm 810 and the driven supporting arm 830 are simultaneously lowered, by connecting via the first pivot 845 and the second pivot 855, heights of the main linkage arm 840 and the driven linkage arm 850 are also simultaneously lowered till fully folded, so the projection screen 90, the upper support 860, the cylinder 820, the first pivot 845, the second pivot 855, the main linkage arm 840 and the driven linkage arm 850 are received in the accommodating space. With the above mentioned tubular motor and or the synchronous motor controlled by a wired or a wireless means for rolling or unrolling and with operations of the supporting arm 810, the cylinder 820, the driven supporting arm 830, the main linkage arm 840 and the driven linkage arm 850 etc, the positioning operation or operation of rolling/unrolling can be operated with an electromotive means.

The present invention also provides a retractable frame of projection screen, wherein an upper support can be served to fold the projection screen 90, and the operation of positioning can be done via a manual braking device or a tubular motor or a synchronous motor.

The retractable frame of projection screen provided by the present invention has advantages of small in volume, light in weight, and production cost thereof can be lowered so as to overcome disadvantages of a convention retractable frame of projection screen.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retractable frame of projection screen comprising:
   a receiving case having an accommodating space;
   a cylinder having a cylinder retractable arm movable between a cylinder arm retracted position and a cylinder arm extended position and a first cylinder retractable arm connected to a first end of the receiving case;
   an upper support;
   a supporting arm having a first supporting arm end connected to the cylinder and a second supporting arm end connected to a second end of the upper support;
   a connecting member provided on the supporting arm; and
   a main retractable arm having a main groove and a driven retractable arm extending from a first end of the main retractable arm, the driven retractable arm is movable between a driven retractable arm retracted position and a driven retractable arm extended position, a first driven retractable arm end of the driven retractable arm is connected to a second end of the receiving case and a second end of the main retractable arm is connected to a first end of the upper support and the connecting member is slidably located in the main groove of the main retractable arm;
   wherein, when the cylinder retractable arm moves from the cylinder arm retracted position to the cylinder arm extended position, the driven retractable arm moving from the driven retractable arm retracted position to the driven retractable arm extended position, the connecting member slidably moving in the main groove of the main retractable arm, and the upper support moving away from the receiving case;
   wherein, when the cylinder retractable arm moves from the cylinder arm extended position to the cylinder arm retracted position, the driven retractable arm moving from the driven retractable arm extend position to the driven retractable arm retracted position, the connecting member slidably moving in the main groove of the main retractable arm, and the upper support moving toward the receiving case.

2. The retractable frame of projection screen as claimed in claim 1, wherein the receiving case, the supporting arm, the main retractable arm and the upper support are made of metals, and the position where one end of the cylinder retractable arm is disposed in the receiving case is substantially parallel to the position where one end of the main retractable arm is connected to the upper support.

3. The retractable frame of projection screen as claimed in claim 1, wherein two ends of the upper support are respectively provided with a first buckling device, and the receiving case further comprises a handle, and two ends of the handle are respectively provided with a second buckling device with respect one of the two first buckling device of the upper support, each of the second buckling devices buckling with a corresponding first buckling device of the upper support.

4. The retractable frame of projection screen as claimed in claim 1, wherein the retractable frame of projection screen further comprises a screen axle and a rolling device, wherein a fixing axle is provided on the screen axle for folding the projection screen, and a first end of the projection screen is connected to the upper support and a second end thereof is connected to the receiving case; the rolling device is located in a component selected from a group consisting of the receiving case and the upper support for rolling the projection screen.

5. A retractable frame of projection screen comprising:
a receiving case having an accommodating space;
a bidirectional cylinder having a first cylinder retractable arm and a second cylinder retractable arm movable between a retracted cylinder position and an extended cylinder position, wherein the first cylinder retractable arm is connected to a first end of the receiving case;
an upper support;
a supporting arm having a first supporting arm end connected to the second cylinder retractable arm of the bidirectional cylinder and a second supporting arm end connected to a second end of the upper support;
a connecting member provided on the supporting arm;
a main retractable arm having a main groove and a driven retractable arm extending from a first end of the main retractable arm, the driven retractable arm is movable between a driven retractable arm retracted position and a driven retractable arm extended position, a first driven retractable arm end of the driven retractable arm is connected to a second end of the receiving case and a second end of the main retractable arm is connected to a first end of the upper support and the connecting member is slidably located in the main groove of the main retractable arm;
wherein, when the first cylinder retractable arm and the second cylinder retractable arm move from the cylinder arm retracted position to the cylinder arm extended position, the driven retractable arm moving from the driven retractable arm retracted position to the driven retractable arm extended position, the connecting member slidably moving in the main groove of the main retractable arm, and the upper support moving away from the receiving case;
wherein, when the first cylinder retractable arm and the second cylinder retractable arm move from the cylinder arm extended position to the cylinder arm retracted position, the driven retractable arm moving from the driven retractable arm extended position to the driven retractable arm retracted position, the connecting member slidably moving in the main groove of the main retractable arm, and the upper support moving toward the receiving case.

6. The retractable frame of projection screen as claimed in claim 5, wherein the receiving case, the bidirectional cylinder, the supporting arm, the main retractable arm and the upper support are made of metals, and the main retractable arm and the supporting arm are connected by the connecting member, the connecting member is selected from a group consisting of a riveting, a screwing, and a protruding tenon.

7. The retractable frame of projection screen as claimed in claim 5, wherein two ends of the upper support are respectively provided with a first buckling device, and the receiving case further comprises a handle, and two ends of the handle are respectively provided with a second buckling device with respect to one of the two first buckling devices of the upper support, each of the second buckling devices are buckled with the corresponding first buckling device of the upper support.

8. The retractable frame of projection screen as claimed in claim 5, wherein the retractable frame of projection screen further comprises a screen axle and a rolling device, wherein a fixing axle is provided on the screen axle for folding the projection screen, and a first end of the projection screen is connected to the upper support and a second end thereof is connected to the receiving case; the rolling device is disposed in the receiving case or on the upper support for rolling the projection screen.

9. A retractable frame of projection screen comprising:
a receiving case having an accommodating space;
a supporting arm, a first end of the supporting arm being connected to a first end of the receiving case, and a protruding tenon being provided on the supporting arm;
a cylinder movable between a retracted position and an extended position, a first end of the cylinder being connected to a middle portion of the supporting arm, and the cylinder being provided with a cylinder retractable arm connected to a middle portion of the receiving case;
a driven supporting arm, a first end of the driven supporting arm being connected to a second end of the receiving case, and a sliding groove being provided on the driven supporting arm for receiving the protruding tenon and allowing the protruding tenon sliding thereon;
an upper support;
a main linkage arm, a first end of the main linkage arm being connected to a second end of the supporting arm via a first pivot and a second end of the main linkage arm being connected to a second end of the upper support;
a driven linkage arm, a first end of the driven linkage arm being connected to a second end of the driven supporting arm via a second pivot and a second end of the driven linkage arm being connected to a first end of the upper support;
wherein, when the cylinder moves from the retracted position to the extended position, the first pivot moving toward the second pivot, the protruding tenon slidably moving in the sliding groove of the driven supporting arm, and the upper support moving away from the receiving case;
wherein, when the cylinder moves from the extended position to the retracted position, the first pivot moving away from the second pivot, the protruding tenon slidably moving in the sliding groove of the driven supporting arm, and the upper support moving towards the receiving case.

10. The retractable frame of projection screen as claimed in claim 9, wherein the receiving case, the supporting arm, the cylinder, the driven supporting arm, the main linkage arm, the driven linkage arm and the upper support are made of metals, and the position where the first end of the cylinder retractable arm of the cylinder is connected to the receiving case is on a right side of the supporting arm.

11. The retractable frame of projection screen as claimed in claim 9, wherein two ends of the upper support are respectively provided with a first buckling device, and the receiving case further comprises a handle, and two ends of the handle are respectively provided with a second buckling device with respect to one of the two first buckling devices of the upper support, each of the second buckling devices is buckled with the corresponding first buckling device of the upper support.

12. The retractable frame of projection screen as claimed in claim 9, wherein the retractable frame of projection screen further comprises a screen axle and a rolling device, wherein a fixing axle is provided on the screen axle for folding the projection screen, and a first end of the projection screen is connected to the upper support and a second end thereof is connected to the receiving case; the rolling device is disposed in the receiving case or on the upper support for rolling the projection screen.

* * * * *